March 18, 1969  R. J. SNEEDEN  3,433,015
GAS TURBINE COMBUSTION APPARATUS
Filed June 23, 1965

INVENTOR.
RALPH J. SNEEDEN
BY Victor D. Behn
ATTORNEY

INVENTOR.
RALPH J. SNEEDEN

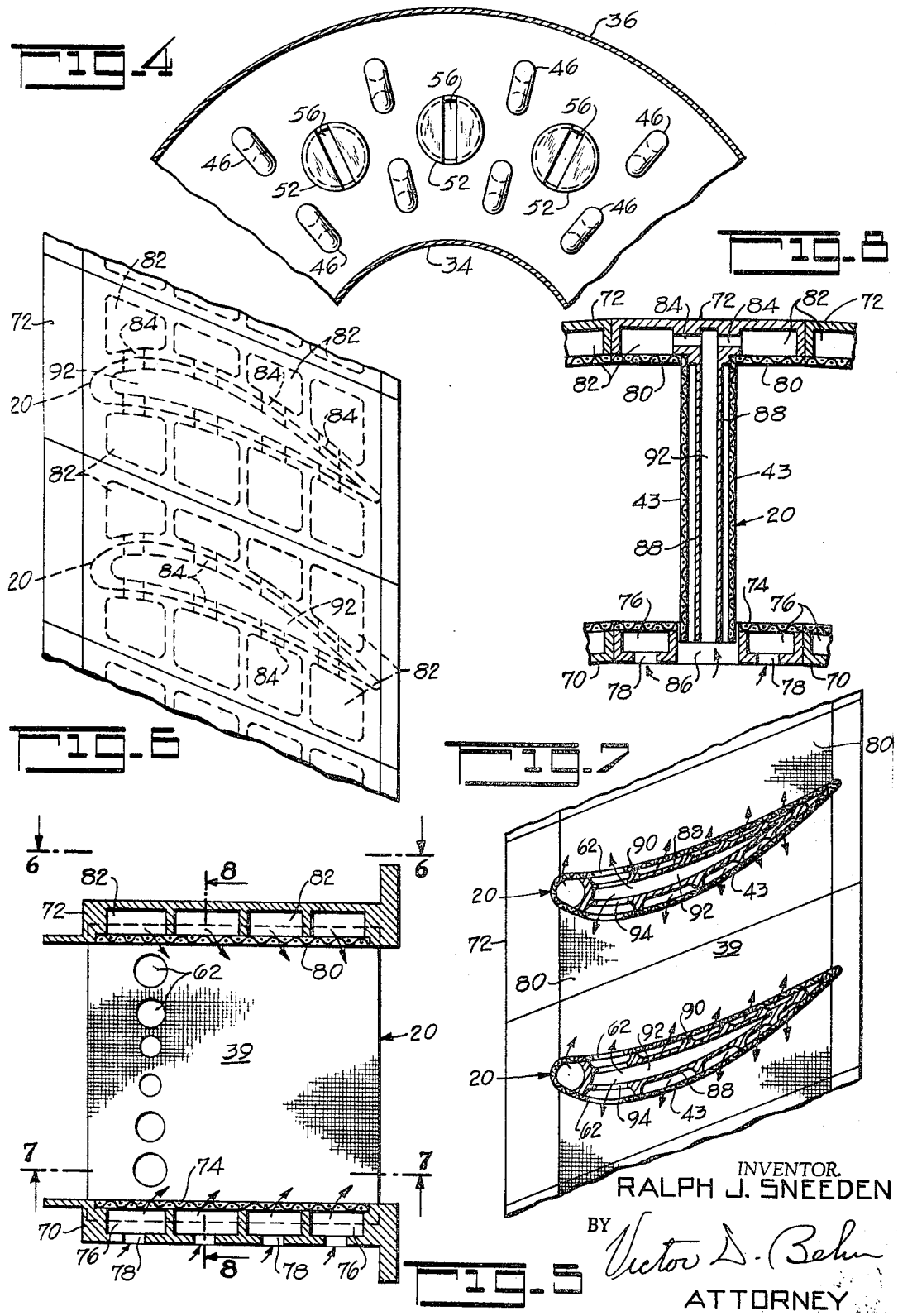

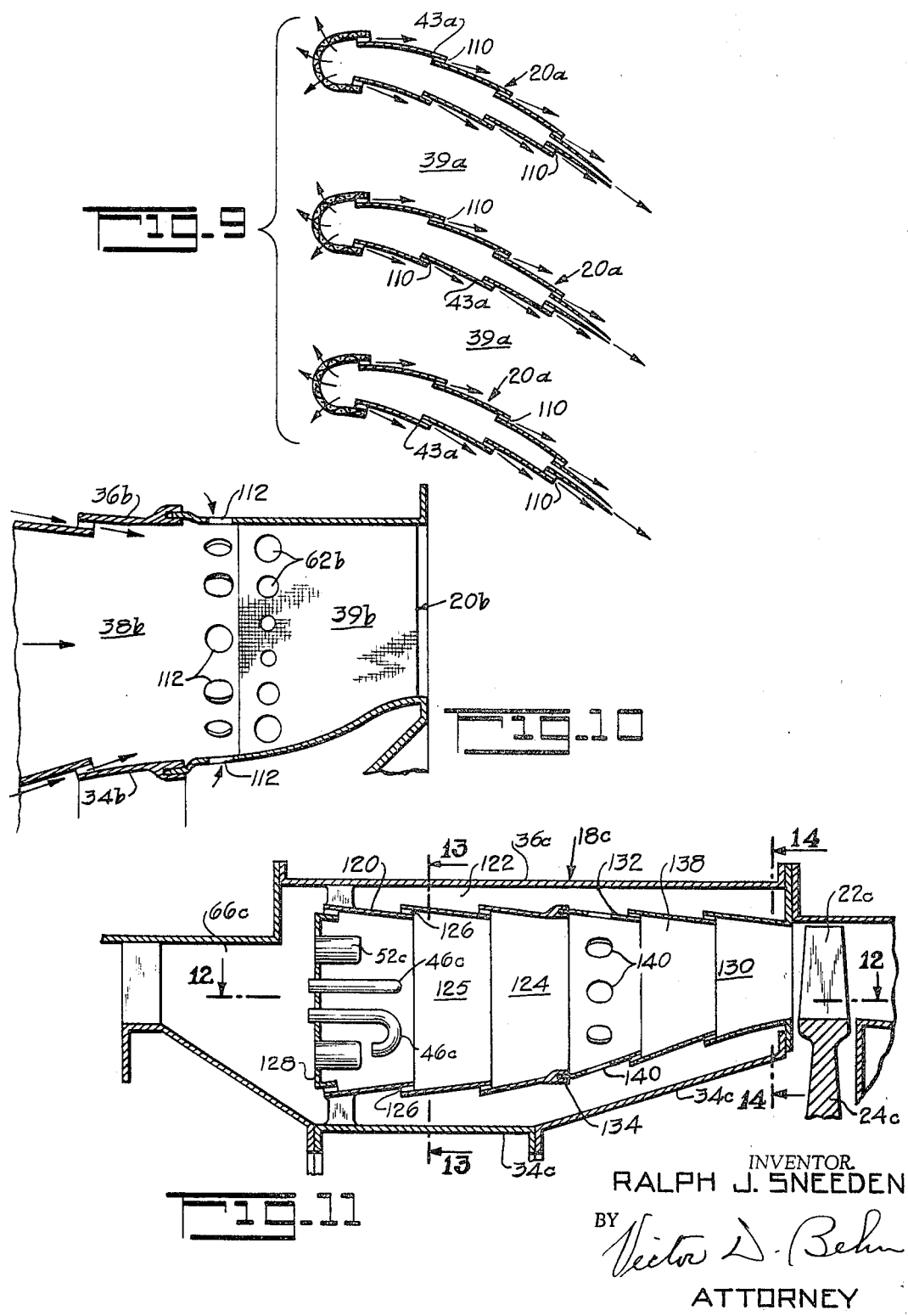

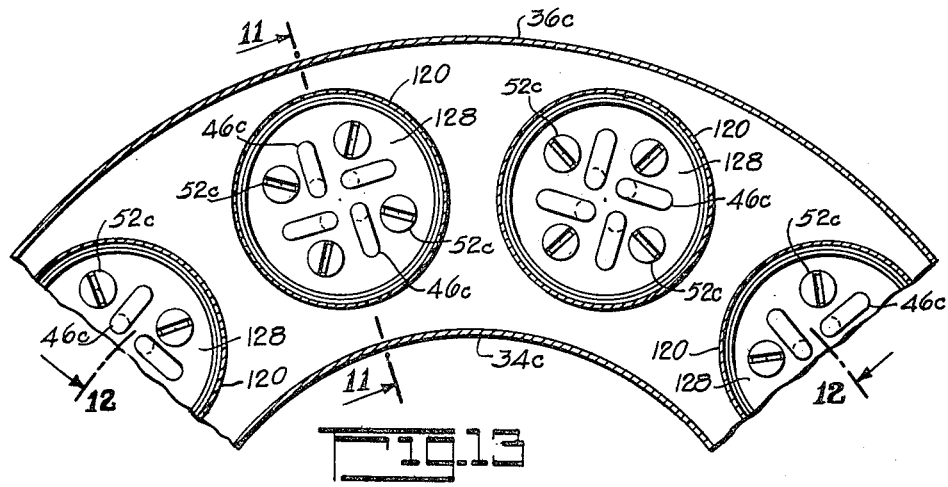
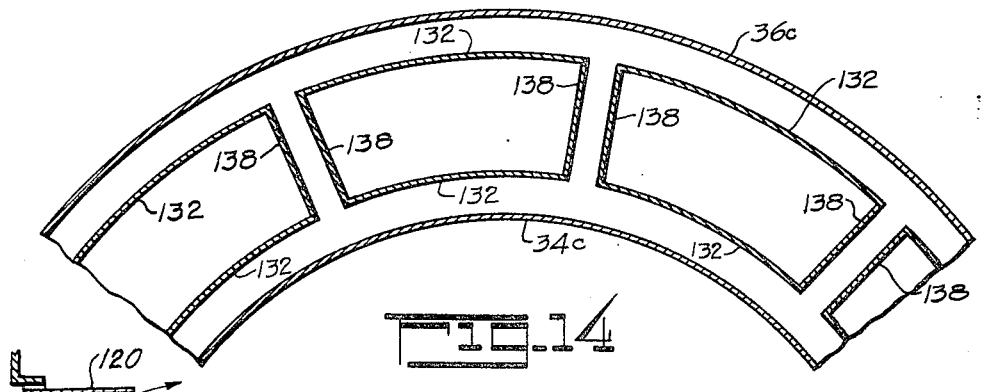
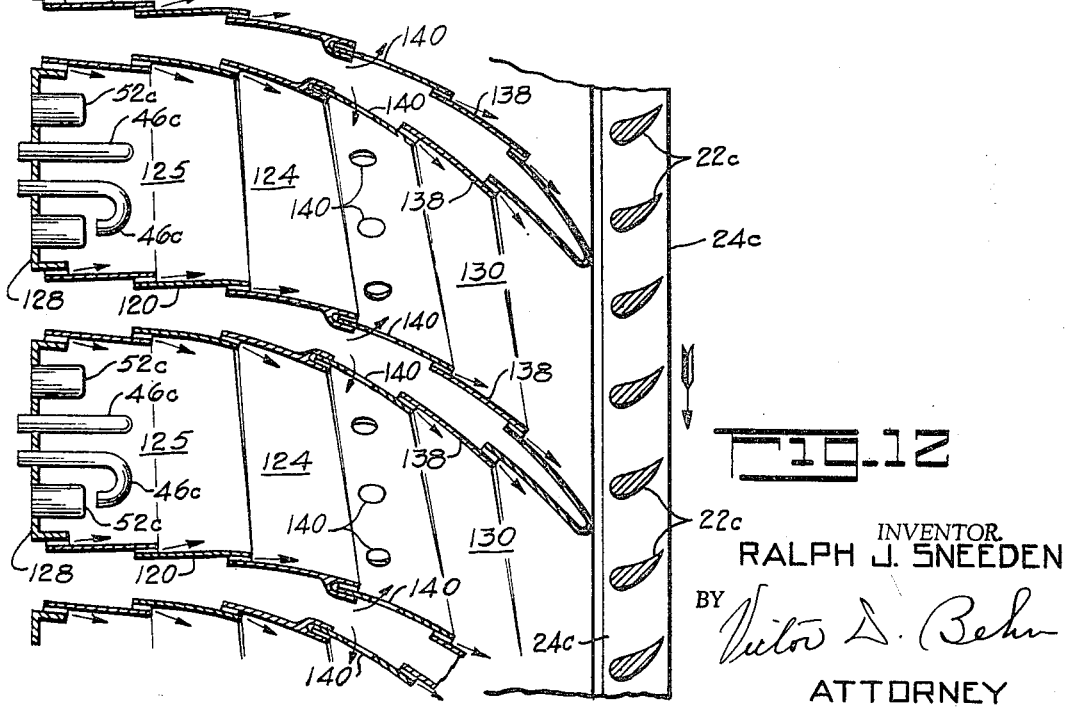

United States Patent Office 3,433,015
Patented Mar. 18, 1969

3,433,015
GAS TURBINE COMBUSTION APPARATUS
Ralph J. Sneeden, Woodcliff Lake, N.J., assignor, by mesne assignments, to the United States of America as represented by the Administrator of the National Aeronautics and Space Administration
Filed June 23, 1965, Ser. No. 466,390
U.S. Cl. 60—39.36                                  4 Claims
Int. Cl. F02g 1/00, 3/00; F02c 3/00

ABSTRACT OF THE DISCLOSURE

Combustion apparatus for a gas turbine engine which is made smaller and lighter than prior art devices by eliminating the conventional diluent section and introducing diluent air into the gas stream through the guide vanes.

Origin of the invention

The invention described herein was made in the performance of work under a NASA contract and is subject to the provisions of Sections 305 of the National Aeronautics and Space Act of 1958, Public Law 85–568 (72 Stat. 435; 42 U.S.C. 2457).

Background of the invention

This invention relates to gas turbine engines and is particularly directed to an improved combustion unit for such engines. More particularly the invention is directed to the provision of a new and improved combustion unit for gas turbine engines which unit is substantially smaller and lighter in weight than prior such combustion units.

Combustion units for a gas turbine engine generally comprise a primary combustion zone and a diluent or mixing zone. In the primary combustion zone the fuel is mixed with sufficient air to form at least approximately a stoichiometric mixture. This primary combustion zone is provided so as to obtain stable and efficient combustion. The temperature of the combustion gases, however, is much too high for direct application to a turbine. The function of the diluent or mixing zone is to add sufficient excess air to the combustion gases to reduce their temperature to a value compatible with the structural limitations of the turbine nozzle guide vanes and the turbine rotor blades. The quantity of excess or diluent air used depends, therefore, on the desired delivery temperature of the combustion gases to the turbine, less diluent air being required as the desired gas temperature increases. In a particular aircraft gas turbine engine the diluent air may be as much as 75% of the total air flow through the gas turbine combustion unit. With modern gas turbine engines presently being designed for aircraft use and having improved turbine blades capable of withstanding higher combustion gas temperatures, for example, of the order of magnitude of 2500° F., the required diluent air may only be approximately 50% of the total air flow. It is contemplated that even with further improvements in high temperaure performance of turbine blades, the required diluent air will still constitute at least 40% of the total air flow.

In such prior art combustion units for gas turbine engines, the walls of the combustion unit are protected from the temperature gases by liner members which are cooled by air flow. These liner members are provided with openings or holes for introducing the diluent air into the primary combustion gases. Patent No. 2,884,759 is an example of such a prior construction.

The diluent air should be thoroughly mixed with the primary combustion gases so as to obtain a substantially uniform temperature of the resulting gases both circumferentially and radially thereby avoiding localized regions of excessive temperatures in the combustion gases. Such thorough mixing, however, has been difficult to achieve. In order to achieve substantially uniform mixing of the diluent air with the primary combustion gases the diluent section of said prior art combustion units had to be made quite long, for example, more than 70% of the total length of the combustion unit.

In order to direct the combustion gases to the turbine rotor blades for driving the turbine rotor, the downstream end of the combustion unit is provided with circumferentially-spaced turbine nozzle guide vanes. In accordance with the present invention these guide vanes are utilized for introducing the diluent air into the primary combustion gases. For this purpose the turbine nozzle guide vanes are moved upstream so that their leading edges are substantially at the downstream end of the primary combustion zone. In addition these vanes are provided with substantially increased chordwise width and all or substantially all the diluent air is introduced through said vanes and then from holes in the vanes into the intervane passages. The arrangement is such that these guide vanes extend over the entire length of the diluent zone of the combustion unit.

An object of the invention therefore comprises the provision of a gas turbine combustion unit in which turbine nozzle guide vanes are utilized for introducing substantially all of the diluent air into the combustion gases.

It is recognized that cooling air has in the past been introduced into the turbine nozzle guide vanes and from which said air has discharged into the combustion gases. In the prior art however such air flow through the nozzle guide vanes has only been for the purpose of cooling said guide vanes and not for cooling the combustion gases and, therefore, has constituted only a very small percentage of the total air supply to the combustion gases, for example, of the order of 3%. With the present invention, however, substantially all the diluent air for the combustion gases is introduced through the turbine nozzle guide vanes.

Other objects of the invention will become apparent upon reading the annexed detail description in connection with the drawing in which.

Figure 1:
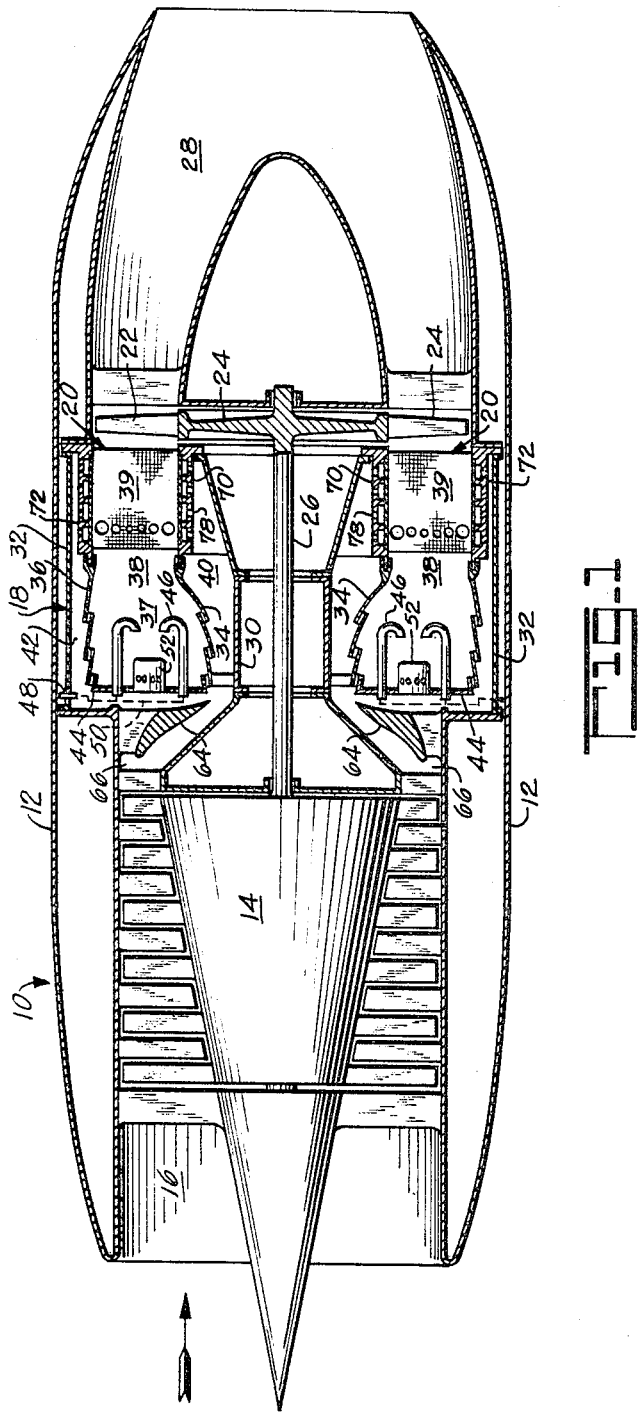
FIG. 1 is a diagrammatic view of a gas turbine engine embodying the invention.
Figure 2:
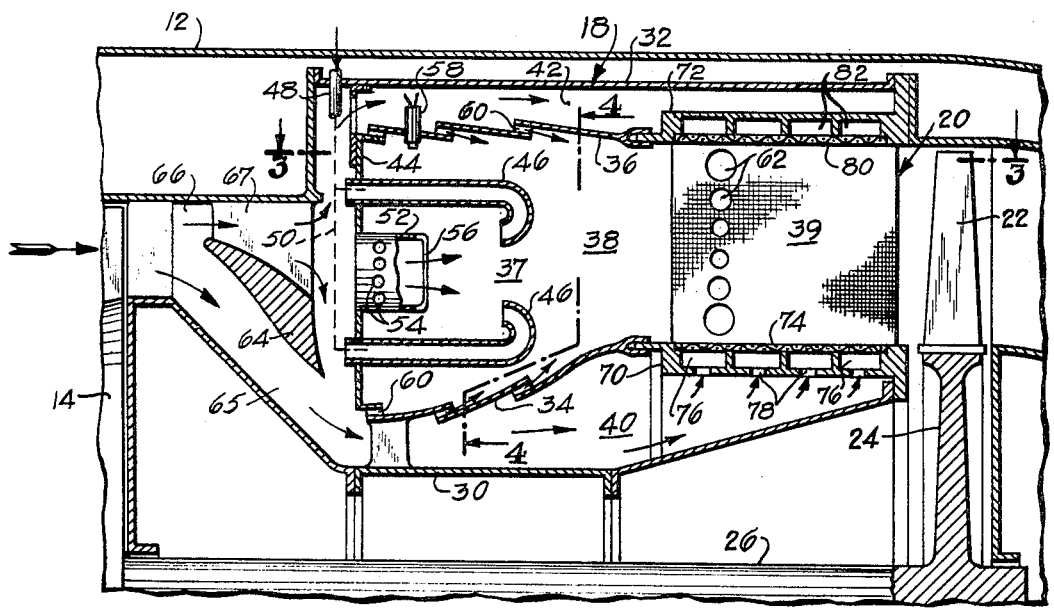
FIG. 2 is an enlarged view illustrating the combustion unit portion of FIG. 1.
Figure 3:
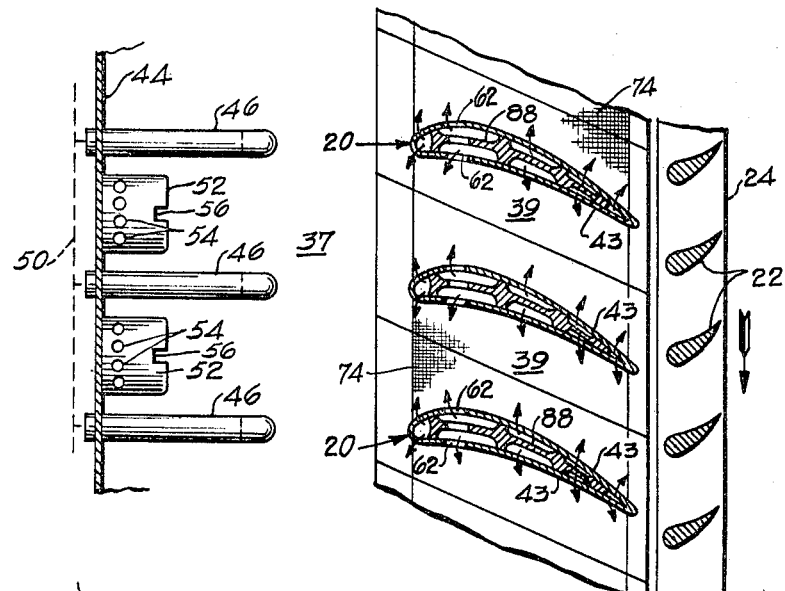

FIGS. 3 and 4 are sectional views taken along lines 3—3 and 4—4 respectively of FIG. 2;

FIG. 5 is an enlarged view of the nozzle guide vane portion of FIG. 2;

FIGS. 6 and 7 are end views taken along lines 6—6 and 7—7 respectively of FIG. 5;

FIG. 8 is a sectional view taken along line 8—8 of FIG. 5;

FIG. 9 is a view similar to the guide vane portion of FIG. 3 but illustrating a modified construction;

FIG. 10 is a partial view of the nozzle guide vane portion of FIG. 2 and illustrating a further modification;

FIG. 11 is a view similar to FIG. 2 but illustrating a modified combustion unit, FIG. 11 being taken along line 11—11 of FIG. 12;

FIG. 12 is a developed view taken along line 12—12 of FIG. 11; and

FIGS. 13 and 14 are sectional views taken along lines 13—13 and 14—14 respectively of FIG. 11.

Referring to the drawing, particularly to FIGS. 1–8, a gas turbine engine is schematically indicated by reference numeral 10 as comprising a duct-like housing 12 having an air compressor 14 journalled within said housing adjacent to its forward or upstream end. The air compressor 14 receives air through an annular air inlet 16 and delivers compressed air to the combustion unit 18.

Within the combustion unit 18 air is burned with fuel and the resulting combustion gases are directed by nozzle guide vanes 20 at the downstream end of the combustion unit to the rotor blades 22 of a turbine rotor 24 for driving said rotor. That is, the guide vanes 20 turn the combustion gases circumferentially about the engine axis so that said gases have a component in the direction of rotation of the turbine rotor blades 22. Considerable air in excess of that required for combustion of the fuel is introduced into the combustion unit for lowering the temperature of the gases to a temperature at which the guide vanes 20 and rotor blades 22 are capable of operating.

A shaft 26 drivably connects the turbine rotor 24 with the air compressor 14. From the turbine blades 22 the combustion gases discharge rearwardly into the surrounding atmosphere through an exhaust nozzle 28 whereby the gas turbine engine is provided with forward propulsive thrust.

The combustion unit 18 is illustrated as comprising annular inner and outer walls 30 and 32 and an inner annular liner 34 for the inner wall 30 and an outer annular liner 36 for the outer wall 32. The liners 34 and 36 form an annular space 38 therebetween which constitutes the combustion chamber of the unit. The inner liner 34 is spaced from the inner wall 30 of the combustion unit to form the annular space 40 to which cooling air is supplied as hereinafter described. Similarly, the outer liner 36 is spaced from the outer wall 32 to leave an annular space 42 to which cooling air is likewise supplied. The gas turbine structure so far described is conventional.

The upstream end of the combustion chamber 38 is closed by a transverse wall or air baffle 44 disposed thereacross. A plurality of open-ended spaced fuel tubes 46 extend through the wall 44, said tubes extending in an axial downstream direction from the wall 44 with the downstream end of each tube being bent back on itself so that each tube 46 has a J-shaped configuration.

Fuel is discharged into the open upstream end of each fuel tube 46 from a fuel supply line 48 as schematically indicated by the fuel connections 50. In addition a portion of the air supplied by the compressor 14 flows into the open upstream end of each fuel tube 46 and thence through the fuel tubes, said air carrying the fuel along with it. The air and fuel are discharged into the combustion chamber 38 in an upstream direction from the discharge ends of the J-shaped fuel tubes 46. Additional air flows into the combustion chamber 38 through the wall 44 through cup-shaped baffle members 52 disposed over openings in the transverse wall 44 with each of said cup-shaped members having side holes 54 and an end slot 56. The air and fuel discharging from the tubes 46 form a combustible mixture along with the air discharging from the cup-shaped baffle members 52, which mixture is ignited in the combustion chamber 38 by suitable igniting means indicated at 58.

The combustion chamber 38 formed between the liners 34 and 36 may be considered as comprising a primary combustion region 37 and a diluent region 39. In the primary combustion region 37 the fuel-air mixture is essentially stoichiometric and this is a relatively sheltered region to provide for stable combustion therein. The fuel-air ratio of the mixture in the primary combustion region 39 will vary somewhat depending on the power output of the engine. Heat from the burning gases in the primary combustion region serves to preheat the fuel supplied through the fuel tubes 46 and to at least partially vaporize the fuel in these tubes. For this latter reason said tubes are known as fuel vaporizing tubes although the primary function of said tubes is to preheat the fuel.

The combustion chamber liners 34 and 36 preferably have a segmented construction consisting of a plurality of annular overlapping cylindrical segments having spaces therebetween providing passages 60 for air flow therethrough from the annular spaces 40 and 42. The air flowing through each passage 60 enters the combustion chamber 38 and flows over the inner combustion chamber surface of the combustion chamber liner segment downstream of said passage 60 to provide a film of cooling air over said inner surface. Aforementioned Patent 2,884,759 describes such a construction in more detail.

In order to reduce the temperature of the combustion gases to a temperature within which the turbine stator guide vanes and rotor blades can operate, excess air or diluent air is introduced into the combustion chamber. In prior art combustion chambers for gas turbine engines and as illustrated in said prior Patent 2,884,759, relatively large holes or openings are provided in the downstream sections of the combustion chamber liners in order to add a substantial quantity of excess air to the combustion gas so as to cool the combustion gases before they reach the turbine nozzle guide vanes at the downstream end of the combustion chamber. As already noted, the percentage of such excess air will be at least 40% of the total air supplied to the combustion chamber and may even be as high as 75% depending on the extent to which it is desired to cool the combustion gases. With the excess air introduced at the inner and outer liners of the combustion chamber in the manner of the prior art the diluent or mixing section of the combustion chamber had to be quite long in order to provide adequate time for substantial mixing of the excess air with the combustion gases before the gases reach the turbine nozzle guide vanes. Obviously, if this mixing is not complete the temperature of the combustion gases will not be uniform, with the result that the hotter regions of the combustion gases will be above the desired average temperatures and may damage the turbine nozzle guide vanes and turbine rotor blades.

In accordnace with present invention, instead of a separate diluent or excess air mixing region for the combustion chamber and a separate region for the turbine nozzle guide vanes, the diluent and nozzle guide vanes are combined into a single section of the combustion chamber 38. Thus as best seen in FIG. 2 the turbine nozzle guide vanes 20 are made much wider in a chordwise direction than the conventional guide vanes and the leading edge of the guide vanes 20 is moved upstream to the downstream end of the primary combustion region 39 of the combustion chamber 38 whereby the intervane passages constitute substantially the entire mixing or diluent region 39 of the combustion chamber. In a conventional turbine nozzle guide vane the chordwise dimension of the vane, that is its width from its leading edge to its trailing edge, is substantially less than the length of the vane. With the turbine nozzle guide vanes 20 of the present invention however each said vane has a chordwise dimension which preferably is greater than its length, that is said chordwise dimension of a vane 20 is greater than its radial dimension between the combustion chamber liners 34 and 36. Said chordwise dimension of each vane 20 actually is greater than one-third of the total length of the combustion chamber from its upstream wall 44 to its downstream end. That is, said chordwise dimension of each vane 20 is at least equal to 50% of the length of the combustion chamber upstream therefrom.

Each guide vane has an airfoil-like profile and has a hollow construction which is open at one or both ends for air flow therein from the adjacent annular space 40 or 42 and then out through the airfoil skin surface 43 of the vanes into the intervane passages or diluent region 39. For this purpose each vane 20 has a series of relatively large holes 62 on each side in the portion of its airfoil surface 43 and disposed adjacent to and along its leading edge for discharging air across the intervane passages 39 for mixing of said air with the combustion gases from the primary combustion region. In addition the skin surfaces 43 of the vanes are provided with a porous construction to provide for air to bleed or flow outwardly through the pores of said surface. For providing this porous construction the surface 43 of the vanes 20 may have a wire mesh construction to permit air to flow outwardly through the fine pores of said mesh.

Because the excess or diluent air is introduced into the combustion gases in a shorter combustion chamber space, radial width of the combustion chamber rather than only at the combustion chamber liners, the present invention provides a more thorough mixing of the diluent air and combustion gases in a shorter combustion chamber space. In addition the degree of dilution can be varied radially across the combustion chamber by appropriate radial distribution of the size and number of the guide vane holes 62 radially across the guide vanes 20. In this way the desired temperature distribution of the combustion gases radially across the combustion chamber can be obtained thereby providing the desired radial temperature distribution at the turbine rotor blades. The combustion chamber is further shortened because the vanes 20 now have a dual function in that they function both to provide the diluent region 39 of the combustion chamber 38 and in addition said vanes provide the nozzle guide vanes for directing the combustion gases into the turbine rotor blades 22.

In the preferred construction of the invention all the diluent air supplied through the guide vanes 20 is introduced into the radially inner end of said vanes from the annular space 40. In order to make sure that the desired percentage of air reaches the inner end of the vanes 20 a suitable annular baffle member 64 is disposed in the air flow path 66 upstream of the combustion unit to divide this path into radially inner and outer annular paths 65 and 67. If for example about 55% of the air is to be supplied to the guide vanes 20 for flow therethrough and if about 5% of the air is to flow through the liner passages 60 in the inner liner member 34 then the baffle member 64 is disposed in the compressor air flow passage 66 at the upstream side of the combustion unit so as to divert 60% of the compressor air through the radially inner portion 65 of the annular passage 66 and from which said air flows into the annular space 40. Then by properly proportioning the size of the inner liner passages 60 and the effective size of the passages provided by the vanes 20 the air supplied to the annular space 40 can be divided so that of the 60% of the total air supplied to the annular space 40 one-twelfth (5% of the total air supply) flows through the inner liner passages 60 to film cool said inner liner 34 and eleven-twelfths or 55% of the total air supply flows through the guide vanes 20 and the guide vane shrouds (hereinafter described) into the intervane passages 39 to dilute and cool the combustion gases. The remaining or 40% of the total air supply is supplied through the radially outer passage 67 and of this air about 35% flows through the fuel tubes 46 and baffles 52 to provide the primary air for combustion and the remaining 5% flows through the outer liner passages 60 to film cool the outer liner 36.

The preferred construction of each guide vane 20 is illustrated in FIGS. 5–8. As there illustrated each guide vane 20 has an inner shroud section 70 and an outer shroud section 72. The shroud sections of adjacent vanes 20 abut each other circumferentially to form complete inner and outer annular shroud structures for the vanes 20 as illustrated. Each inner shroud section 70 has a hollow construction with the inner wall of said section having a porous construction formed, for example, by means of fine wire mesh material 74. The hollow interior of the portion of each inner shroud section 70 projecting circumferentially beyond its vane 20 is divided by ribs into a plurality of compartments 76 having holes 78 for the supply of air thereto from the inner annular space 40. In this way air from the inner annular space 40 enters the inner shroud compartments 76 and discharges therefrom through the porous inner liner 74 for cooling said liner. The liner portions 74 of the inner shrouds 70 form continuations of the inner liner 34 of the combustion chamber.

Each outer shroud section 72 has a similar hollow construction. Thus the hollow outer shroud sections 72 each has a porous inner liner 80 and the hollow interior portion of each outer shroud section projecting circumferentially beyond its vane 20 is divided into a plurality of compartments 82 having holes 84 for the supply of air thereto from the hollow interior 92 (hereinafter described) of the associated vane 20. Thus air enters each of the compartments 82 through the openings 84 and discharges from the porous liners 80 for the outer shrouds 72 thereby cooling said liners. The liners 80 for outer vane shouds 72 form a continuation of the outer liner 36 of the combustion chamber.

The shroud holes 78 and 84 are sized so that only about 5% of the total air supply flows into the shroud compartments 76 and 82 for cooling the associated shroud liners 74 and 80 respectively.

The airfoil section of each guide vane 20 is formed rigid with its outer shroud section 72 and has a telescopic sliding fit with an opening 86 in its inner shroud 70 to permit thermal expansion and contraction of the airfoil section of each guide vane relative to its inner shroud 70. As illustrated the airfoil section of each guide vane 20 is hollow and open at its radially inner end for the supply of air thereto. The airfoil section of each guide vane 20 consists of a strut 88 which is integral with its outer shroud 72, said strut having external ribs 90 running lengthwise of the strut and over which the porous airfoil surface 43 of the vane is secured. With this arrangement longitudinal channels are formed between the radial or lengthwise extending ribs 90 of each guide vane 20, said channels forming the hollow interior of said guide vane and opening to the inner annular space 40 through the shroud opening 86 at the radially inner end of the guide vane. Each strut 88 is illustrated in FIGS. 5–8 as having a hollow interior 92 for reducing its weight and, in order to increase the air supply to the vane surface openings 62, openings 94 are provided in the strut 90 for supplying air from the interior of the hollow strut to the strut longitudinal channel with which the surface openings 62 communicate.

With the foregoing structure of FIGS. 5–8 all the diluent air supplied through the airfoil sections of the guide vanes 20 into the diluent combustion chamber section or intervane passages 39 enters said vanes at their radially inner ends through the openings 86. A substantial portion of this air discharges through the radial line of holes 62 in the surface of each guide vane 20 adjacent the vane leading edge and the remainder through the porous skin of said vane. Although only a single line of holes 62 has been illustrated on each surface of each guide vane 20, it is obvious that more than one radial line of such holes may be provided in each surface of the guide vanes 20.

In FIG. 3 each vane strut 88 is not illustrated as having a hollow interior 92 because of the reduced scale of FIG. 3. Obviously if desired however the struts 90 of each guide vane 20 may be made solid as illustrated in FIG. 3.

Supplying all the diluent air to the vanes 20 from the radially inner ends of said vanes has certain advantages as compared to an arrangement in which some or all of said diluent air is supplied from the radially outer ends of said vanes. Thus the fuel supply line 48 and fuel connections 50 and the ignitor 58 provide obstructions to the air supply to the outer annular space 42 which could result in a non-uniform air flow distribution around the annular space 42. Such a non-uniform air flow in the outer annular space 42 could lead to a non-uniform distribution of the diluent air in the vanes 20 if some or all of said air were supplied to the vanes 20 from the outer annular space 42. It should also be noted that since the air flowing through and supplied by the compressor 14 has a substantial circumferential velocity component, solid particles or other foreign matter in the compressor air will tend to accumulate in the radially outer portion 67 of the compressor air flow. The baffle member 64 serves to divert the radially inner portion 65 of the compressor air to the inner annular space 40. Therefore, the radially inner annular space 40 will be relatively free of solid foreign particles as compared to the radially outer annular space 42. If, as illustrated, the vanes 20 and their shrouds 70 and 72 have a skin surface formed with minute openings therethrough, as by a fine wire mesh, it is important that only clean air be supplied to the vanes 20 and shrouds 70 and 72 for flow through said minute openings in order to avoid said openings from becoming clogged. For these reasons it is preferred to supply all the air to the vanes 20 and their shrouds 70 and 72 from the inner annular space 40 at the radially inner ends of said vanes.

In the prior art combustion apparatus construction in which the turbine nozzle guide vanes are disposed downstream of the diluent region of the combustion chamber, it is known to provide a cooling air flow through the guide vanes solely for cooling said vanes. In such a prior art construction the magnitude of the cooling air flow is of the order of magnitude of 3% of the total air supplied to the combustion apparatus. In the present invention however the air supplied to the guide vanes has the primary function of diluting the combustion gases and as such constitutes 40–75% of the total air supply to the combustion chamber. With this relatively large percentage of air flowing through the turbine nozzle guide vanes this air flow is considerably more than adequate for cooling said vanes. Because the air flow through the guide vanes 20 is many times more than is required to cool said vanes, uneven temperature distribution in the primary combustion gases approaching the guide vanes can to a substantial extent be ignored in the structural design of these vanes. Any circumferential non-uniformity of the temperature of the gases is averaged out by the rotor blades. This relative insensitivity of the combustion unit of the invention to non-uniform temperature distributions permits further shortening of the combustion chamber.

The use of a fuel vaporizing system, for example such as illustrated, is particularly advantageous with the present invention because in such a system fuel is introduced into the combustion chamber at a relatively large number of points. It is desirable that the number of fuel tubes 46 for introducing fuel into the combustion chamber 38 be related to the number of guide vanes 20 so that each intervane passage 39 has the same number of fuel tubes 46 upstream therefrom. Such an arrangement will result in a substantially similar average temperature of the combustion gases entering each intervane passage 39 from the primary combustion region 37. Thus as illustrated there are the same number of radial pairs of fuel tubes 46 as there are vanes 20. The combination diluent combustion chamber region and stator guide vane construction of the present invention obviously however can also be used with a combustion unit in which the fuel is introduced by fuel spray discharge nozzles instead of through fuel vaporizing tubes as herein illustrated. The number of such nozzles and number of guide vanes 20 preferably also should be related so that one is a whole number multiple of the other so that the gases entering the intervane passages 39 have substantially the same average temperature.

It should be noted that although the present invention is particularly suited for use with a fuel vaporizing type of burner structure it is not limited to use with the specific fuel vaporize burner structure illustrated, consisting of the J-shaped fuel vaporizer tubes 46 and primary air baffles 52.

FIG. 9 is a view similar to a portion of FIG. 3 and the parts of FIG. 9 have been designated by the same reference numerals but with a subscript $a$ added thereto as the corresponding parts of FIG. 3. In FIG. 9 the nose portion of the airfoil surface 43a of each vane 20a still has a porous skin surface. In addition to and/or in lieu of the holes 62 the remaining portion of the airfoil surface 43a of each vane 20a has a series of slots 110 spaced from the nose to the trailing edge and running radially substantially the entire length of each vane 20a. With this arrangement the air flowing into the hollow interior of each vane 20a discharges in part through the porous nose of the vane and in part through its slots 110 into the intervane passages 39a. The modification of FIG. 9 is otherwise like that of FIG. 3.

FIG. 10 is a still further modification of FIGS. 2 and 3 and the parts of this modification have been designated by the same reference numerals but with a subscript $b$ added thereto as the corresponding parts of FIGS. 2 and 3. In FIG. 10 the portion of the inner and outer liner members 34b and 36b immediately upstream of the leading edges of the vanes 20b are provided with holes 112 for introducing some of the diluent air into the intervane passages 39b immediately upstream of and axially in line with the vanes 20b as a means of blanketing or shrouding the vanes 20b with relatively cool air. The remaining portion of the diluent air is introduced into the vanes 20b and then out through the airfoil surface of said vanes into the intervane passages 39b as in FIGS. 2 and 3. FIG. 10 also illustrates a further modification in that in FIG. 10 the radial length of each guide vane 20b is greater at its leading edge than at its trailing edge whereas in FIG. 2 the radial dimension of each guide vane 20 is constant from its leading edge to its trailing edge.

The invention has been illustrated and described in connection with an annular combustion unit construction in which the combustion chamber 38 is formed by radially-spaced annular liner members 34 and 36. Another conventional type of combustion unit invention consists of a number of can-type combustion chamber elements disposed in an annular configuration for supplying combustion gases to the turbine rotor blades. U.S. Patent No. 2,625,011 is an example of this latter type of combustion unit. The invention is obviously equally applicable to this latter type of combustion unit and such an embodiment of the invention is illustrated in FIGS. 11–14 and the parts of FIGS. 11–14 corresponding to the parts of FIGS. 1–8 have been designated by the same reference numeral but with a subscript $c$ added thereto.

In FIGS. 11–14 the combustion unit 18c has inner and outer annular walls 34c and 36c which as in the modification of FIGS. 1–8 form a continuation of the annular discharge passage of the engine compressor. A plurality of circumferentially-spaced can-type combustion chamber liner members 120 are mounted in the annular space 122 between said annular walls 34c and 36c. The combustion chamber liner members form individual combustion chambers 124 instead of a single annular combustion chamber 38 as in FIGS. 1–8. At the upstream or primary combustion region 125 of each combustion chamber 124 the liner members 120 have a cylindrical configuration and consist of overlapping cylindrical sections providing annular openings or slots 126 for air flow therethrough to cool the liner member. The upstream end of each combustion chamber is closed by a transverse wall 128 on which the fuel vaporizer tubes 46c and cup-like air baffle members 52c are mounted for supplying fuel and primary air to each combustion chamber 124 in a manner similar to that described in connection with FIGS. 1–8. The arrangement of the fuel vaporizing tubes 46c and cup-like air baffle members 52c have been shown similar to that illustrated in prior Patent 2,625,011 and therefore, these details of the burner structure form no part of the present invention.

Air from the engine compressor is supplied from the compressor outlet 66c to the annular space 122 of the combustion unit. Some of this air enters each combustion chamber 124 through the fuel tube 46c and cup-shaped air baffles 52c to provide the primary air for combustion. The remainder of the compressor air flows around the combustion chamber liner members and some flows through the slots 126 to film cool the inner surface of said liner members and the remainder of the air enters the diluent region 130 of each combustion chamber to cool the combustion gases.

The diluent region 130 of each combustion chamber 124 is formed by a tubular structure 132 having a circular upstream end which is fitted at 134 to the downstream end of the combustion chamber liner for the primary combustion region. As shown in FIGS. 11–14 the cross-section of each tubular diluent structure changes from a circular cross-section at its upstream end to a rectangular section at its downstream end. The rectangular sections of the tubular diluent structures 132 of the combustion units are disposed in circumferentially-spaced side-by-side relation to form a substantially complete annular diluent region structure so that the circumferentially-spaced walls 138 of said rectangular sections form the circumferentially-spaced walls of the circumferentially-spaced passages which comprise the individual diluent regions 130 of the combustion chambers 124. The circumferentially-spaced walls 138 of said rectangular combustion chamber sections extend radially across the annular structure of the diluent region 130 and they have a helical-type configuration about the combustion unit axis for turning the combustion gases circumferentially in the direction of rotation of the turbine rotor blades 22c. Thus the circumferentially-spaced liner walls 138 of the rectangular diluent sections of each combustion chamber form the guide vane structure for directing the combustion gases into the turbine rotor blades 22c. The guide vane walls 138 of the rectangular diluent section of each combustion chamber have a plurality of relatively large openings 140 for admitting diluent air into the combustion chamber for cooling the combustion gases. As in the previously described modifications this diluent air flow through the walls 138 comprises at least 40% of the total air flow supplied to the combustion unit.

The modification of FIGS. 11–14 is similar to that of FIGS. 1–8 in that in both embodiments of the invention the diluent section of the combustion unit comprises a plurality of circumferentially-spaced passages formed by circumferentially-spaced walls (airfoil surfaces 43 in FIGS. 1–8 and surfaces 138 in FIGS. 11–14) which turn the combustion gas flow circumferentially so that said flow has a circumferential component in the direction of rotation of the turbine rotor blades. In addition both said wall surfaces 43 and 138 for circumferentially-spaced walls extending radially across the diluent region of the combustion unit and through which the diluent or secondary air for the combustion unit is discharged into the combustion gases. In both embodiments said circumferentially-spaced diluent section surfaces 43 and 138 have a length as measured along the combustion unit axis which is at least one-third the total length of the combustion unit.

Although the invention has been described above in a preferred embodiment, it will be understood that various changes and modificaitons may be made by one skilled in the art without departing from the scope of the invention. It is intended to cover all such modifications in the appended claims.

What is claimed is:

1. A combustion unit for a gas turbine engine, said combustion unit comprising:
 (a) inner and outer annular walls providing an annular combustion gas chamber therebetween, said inner annular wall defining a dilution air chamber;
 (b) means disposed upstream of said gas chamber for dividing air delivered by the compressor into a radially outer air flow and a radially inner air flow and for directing said radially inner air flow into said dilution air chamber;
 (c) means for vaporizing fuel and for introducing said vaporized fuel and air from said radially outer flow into the upstream end of said annular combustion chamber for combustion therein;
 (d) a plurality of circumferentially-spaced vanes having airfoil-shaped portions extending radially across said annular combustion chamber adjacent to the downstream end thereof for guiding the combustion gases as they discharge from the combustion unit, each of said vanes having a hollow interior communicating with said dilution air chamber and having openings in its vane airfoil portion; and
 (e) means for directing into the hollow interior of said vanes substantially all the air for diluting the combustion gases, said air discharging from said vanes into the combustion gases thereby cooling said gases and also cooling said vanes.

2. A combustion unit as claimed in claim 1 in which the fuel vaporizing and introducing means consists of a plurality of circumferentially-spaced fuel vaporizing tubes at the upstream end of said combustion chamber, each of said tubes being arranged to discharge vaporized fuel and air in an upstream direction into said combustion chamber, and in which the number of said vanes and the number of said tubes are related so that one is a whole number multiple of the other so that each intervane passage is opposite the same number of fuel vaporizing tubes as any other intervane passage.

3. A combustion unit as claimed in claim 1, wherein said hollow vanes communicate at their radially inner ends with said dilution air chamber.

4. A combustion unit as claimed in claim 1 in which said vanes are surrounded by inner and outer shrouds, said shrouds being permeable for transpiration cooling thereof, said inner shroud receiving cooling air from said dilution air chamber and said outer shroud receiving cooling air from said hollow vane interiors.

References Cited

UNITED STATES PATENTS

| | | | |
|---|---|---|---|
| 2,625,011 | 1/1953 | Allen | 60—39.14 |
| 2,884,759 | 5/1959 | Sevcik | 60—39.65 |
| 3,316,714 | 5/1967 | Smith | 60—39.65 |

CARLTON R. CROYLE, Primary Examiner.

U.S. Cl. X.R.

253—39.1; 60—39.65, 39.66; 317—240, 258